March 16, 1954     W. G. LUNDQUIST     2,672,013
GAS TURBINE COOLING SYSTEM
Filed June 30, 1950     3 Sheets-Sheet 1
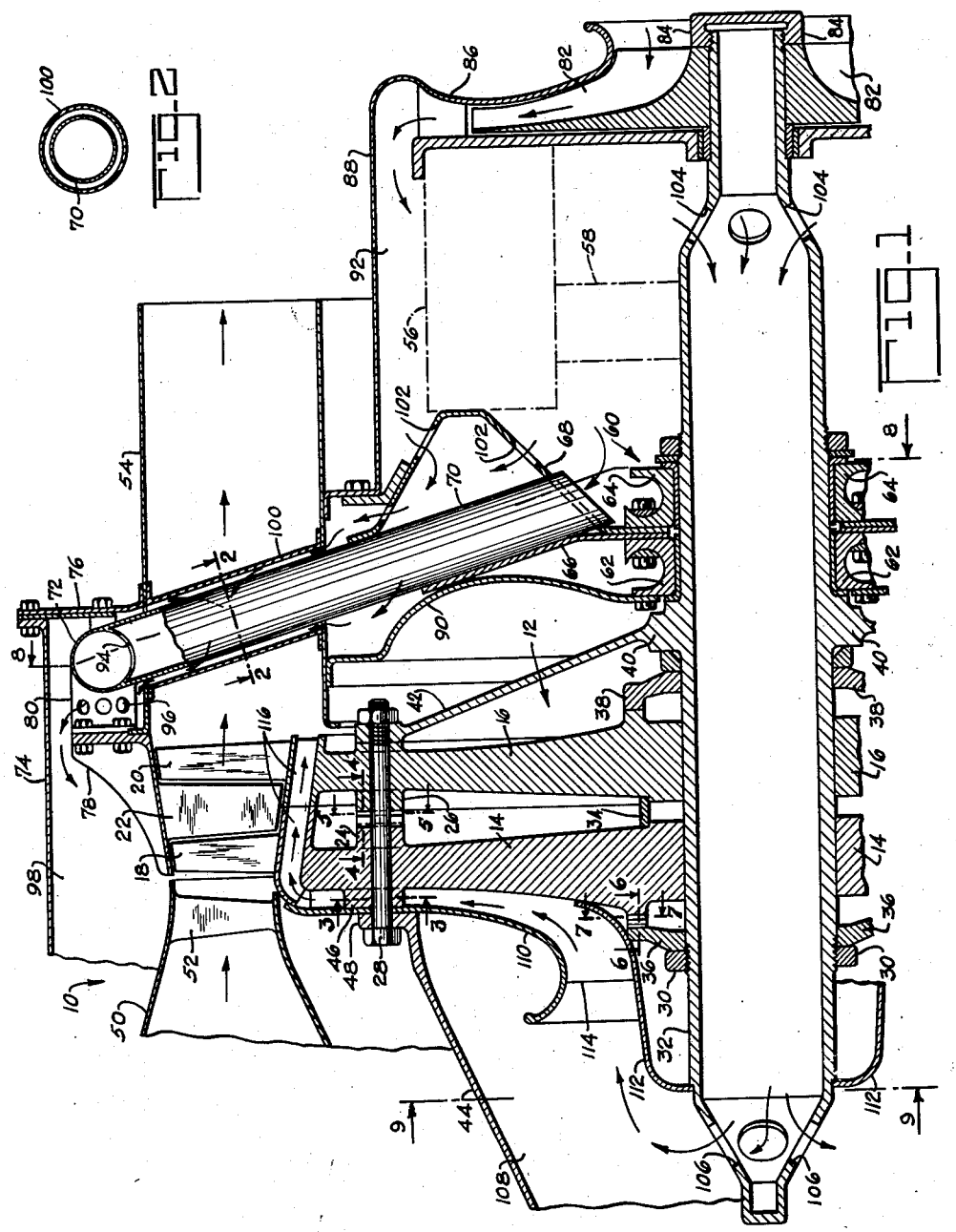
INVENTOR.
WILTON G. LUNDQUIST.
BY
ATTORNEY March 16, 1954 W. G. LUNDQUIST 2,672,013
GAS TURBINE COOLING SYSTEM
Filed June 30, 1950 3 Sheets-Sheet 2
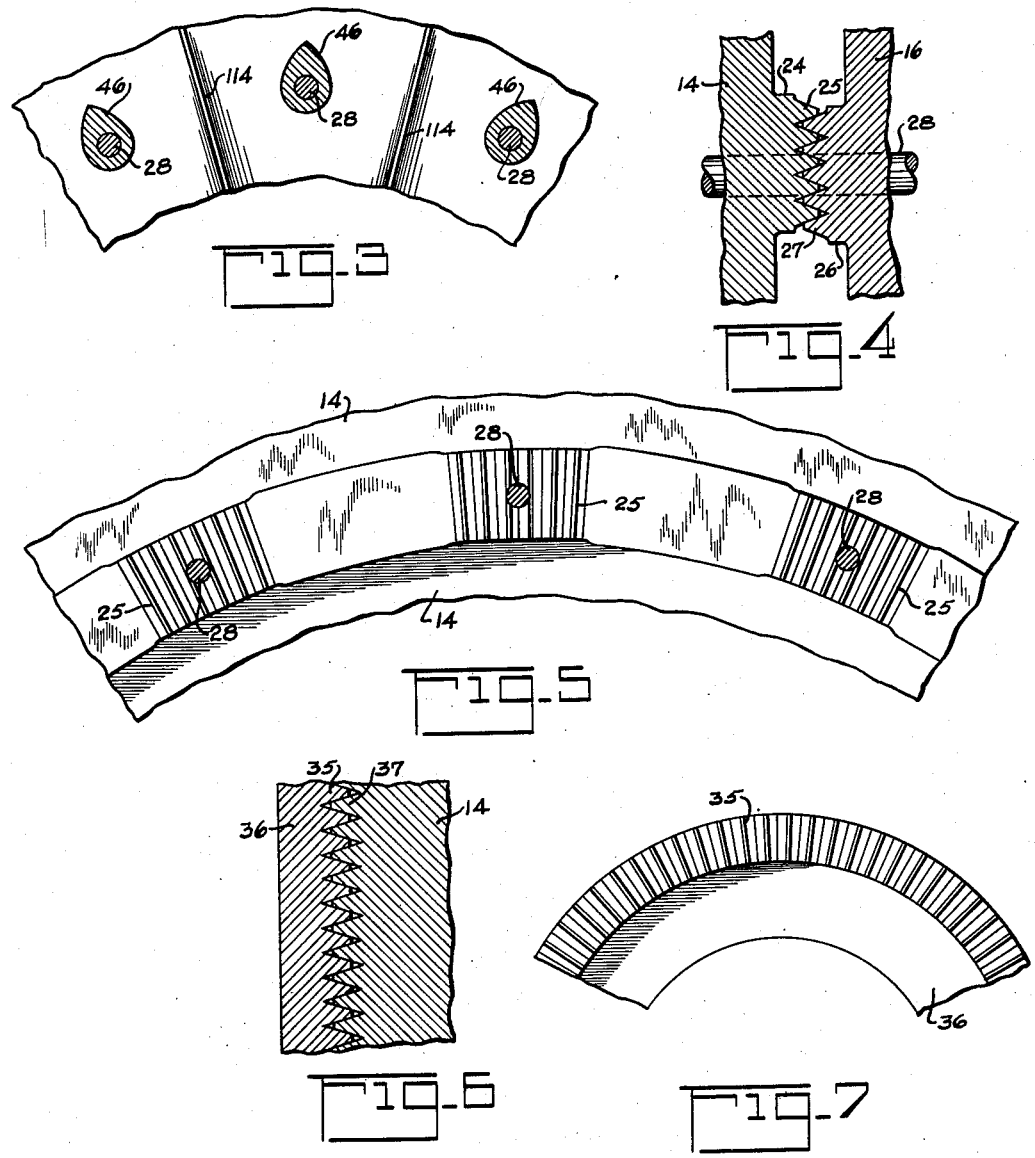
INVENTOR.
WILTON G. LUNDQUIST.
BY
ATTORNEY March 16, 1954 — W. G. LUNDQUIST — 2,672,013
GAS TURBINE COOLING SYSTEM
Filed June 30, 1950 — 3 Sheets-Sheet 3
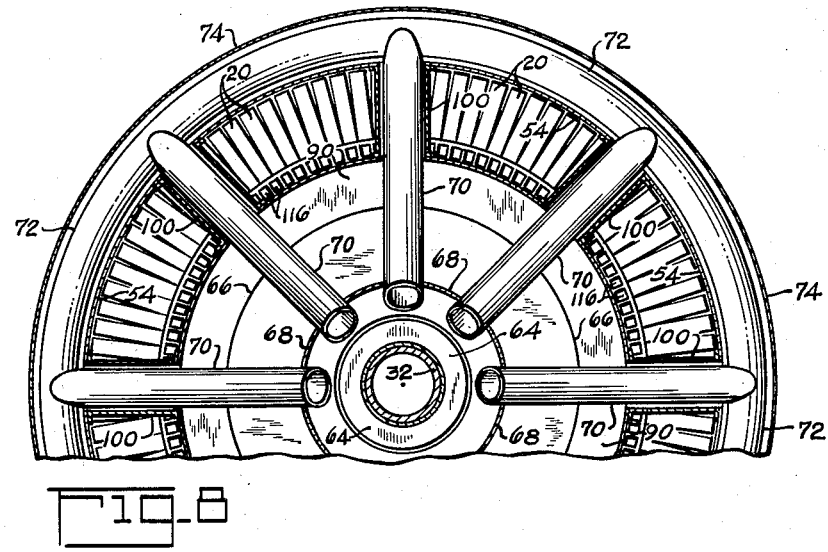
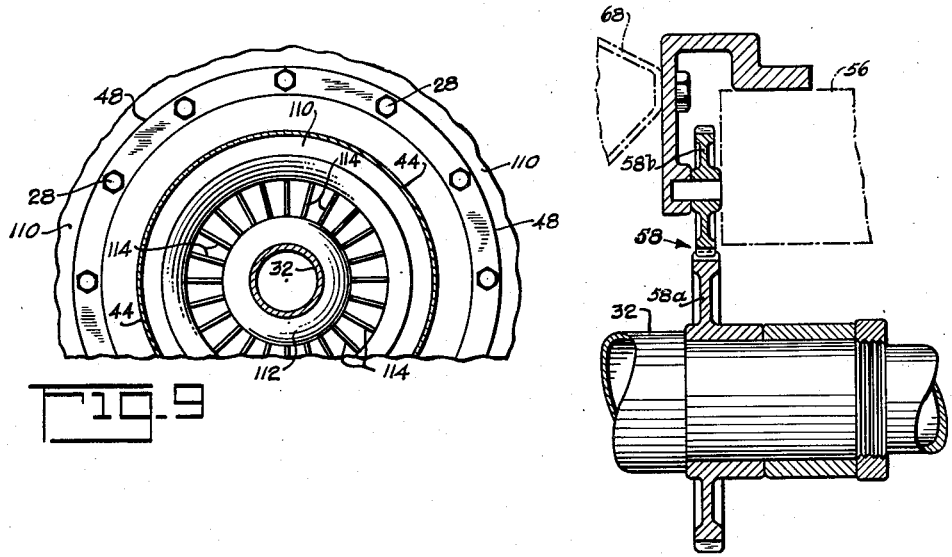
INVENTOR.
WILTON G. LUNDQUIST.
BY
ATTORNEY Patented Mar. 16, 1954

2,672,013

UNITED STATES PATENT OFFICE 2,672,013

GAS TURBINE COOLING SYSTEM

Wilton G. Lundquist, Hohokus, N. J., assignor to Curtiss-Wright Corporation, a corporation of Delaware Application June 30, 1950, Serial No. 171,349

6 Claims. (Cl. 60—39.66)

This invention relates to gas turbine cooling systems and is particularly directed to an arrangement for providing a gas turbine power plant with cooling air.

The efficiency and performance of a gas turbine power plant increases with increase in the temperature of the gas turbine working fluid. Accordingly, it is desirable to provide means for cooling the turbine to permit gas turbine operation at high gas temperatures. An object of the present invention comprises the provision of a novel and efficient arrangement for supplying and distributing cooling air over portions of a gas turbine power plant.

In accordance with the present invention an air impeller, drivably connected to the turbine rotor, supplies the turbine with cooling air. A portion of the air supplied by said impeller is used for cooling various accessory units of the gas turbine power plant and for cooling the turbine stator structure. Another portion of the air supplied by said impeller is received by a second impeller which causes said air to flow in heat exchange relation with the periphery of the turbine rotor.

Other objects of the invention will become apparent upon reading the annexed detailed description in connection with the drawing in which:

Figure 1 is a schematic sectional view of a portion of a gas turbine power plant embodying the invention;

Figures 2, 3, 4, 5, 6, 7, 8 and 9 are sectional views taken along line 2—2, 3—3, 4—4, 5—5, 6—6, 7—7, 8—8 and 9—9, respectively, of Figure 1; and Figure 10 is a view illustrating a driving connection to one of the auxiliary units.

A conventional gas turbine power plant comprises an air compressor which supplies air for combustion to a combustion chamber. From said combustion chamber the working fluid comprising combustion gases and excess air, is directed against the blades of the turbine rotor for driving said rotor, said rotor in turn driving said air compressor. The working fluid discharges rearwardly from the turbine rotor to provide the power plant with forward propulsive thrust. A conventional bladed propeller may also be driven by the turbine rotor. Such a power plant is illustrated in applicant's prior Patent No. 2,469,439.

Referring to the drawing, a portion of a gas turbine power plant 10 is illustrated as comprising a two-stage rotor 12, said rotor consisting of a first-stage rotor disc 14 and a second stage rotor disc 16. A plurality of circumferentially spaced blades 18 are secured to and about the periphery of the first stage rotor disc 14 and a plurality of circumferentially spaced blades 20 are secured to and about the periphery of the second stage rotor disc 16. A plurality of stator blades 22 are disposed between said first and second stage rotor blades 18 and 20.

The turbine rotor disc 14 has an annular flange 24 abutting a corresponding annular flange 26 on the rotor disc 16, said rotor discs being clamped together by a plurality of circumferentially spaced bolts 28 extending through said flanges. The flange 24 has a plurality of radially extending splines or teeth 25 meshing with corresponding splines 27 on the flange 26 whereby said splines maintain the rotor discs 14 and 16 coaxial. Said splines 25 and 27 may be disposed around the entire circumference of said flanges or, as illustrated, only in the regions adjacent to and on each side of the bolts 28. The rotor discs are also clamped together at their hub portions by a nut 30 threaded on a hollow shaft 32 extending through said hub portions. A spacer ring 34 is disposed between the hub portions of the rotor discs 14 and 16 and a first washer 36 is disposed between the hub portion of the rotor disc 14 and the nut 30 and a second washer 38 is disposed between the rotor disc 16 and a shoulder 40 on the shaft 32, whereby said nut is effective to clamp the rotor assembly against the shaft shoulder 40. The washer 36 is provided with a plurality of radially extending splines or teeth 35 meshing with corresponding splines 37 on the rotor disc 14 whereby said splines center the turbine rotor discs relative to the axis of the shaft 32.

The shaft 32 has a conical flange 42 which is drivably connected by the bolts 28 to one side of the turbine rotor 12 adjacent to the periphery of said rotor. A second shaft 44 has a conical end which is drivably connected by the bolts 28 to the other side of the turbine rotor adjacent to the periphery of said rotor. For this latter purpose the turbine rotor disc 14 is provided with a plurality of circumferentially spaced bosses 46, the bolts 28 extending through said bosses and through an annular flange 48 on the shaft 44. The shaft 44 is drivably connected to an air compressor (not shown) which supplies air under pressure to the combustion chamber 50 of the power plant 10. From the combustion chamber 50 the combustion gases and excess air are directed against the first stage rotor blades 18 by stator blades 52. From the first stage rotor blades 18, said gases are directed against the second stage rotor blades 20 by stator blades 22. The gases discharge from the rotor blades 20 into an annular exhaust duct 54 and thence discharge rearwardly into the surrounding atmosphere to provide the power plant with forward propulsive thrust.

A plurality of power plant auxiliary units, schematically indicated at 56, are disposed about the shaft 32 in the annular space between said shaft and the exhaust duct 54. The units 56 may comprise fuel and/or oil pumps and are drivably connected to the shaft 32 by means schematically indicated at 58. The means schematically indicated at 58 may also provide a bearing for the shaft 32. A suitable driving connection 58 for one of the units 56 is illustrated in Figure 10 in which a gear 58a, secured to the shaft 32, is disposed in meshing engagement with a pinion 58b drivably connected to said unit 56. Each of the other units 56 may be similarly connected to the shaft 32.

The shaft 32 is journaled in a bearing structure 60. The bearing structure 60 comprises two annular bearing members 62 and 64 bolted together and between which annular bearing diaphragms 66 and 68 are secured. The bearing diaphragms 66 and 68 are each connected to the radially inner ends of a plurality of circumferentially spaced hollow struts 70 extending through the annular exhaust duct 54. The radially outer ends of the hollow struts 70 are secured to a hollow supporting ring 72 disposed about the exhaust duct 54, said ring being secured to the power plant housing 74 by annular plates 76. In addition the auxiliary units 56 are supported in position about the shaft 32 by the diaphragm 68. With this construction, the turbine rotor, the bearing structure 60 and the auxiliary units 56 are supported from the power plant housing 74 by the hollow struts 70 and the hollow ring 72. The turbine stator blades 22 are also supported from the ring 72. Thus the turbine stator blades 22 are secured to a bracket structure 78 which in turn is secured to a plurality of circumferentially spaced and relatively short hollow struts 80 connected to the ring 72.

A conventional centrifugal type air impeller 82 is secured to the rear end of the shaft 32 by a nut 84, said nut clamping the impeller 82 against a shoulder on said shaft. A fixed annular shroud 86 extends across the outer ends of the blades of the impeller 82. A forward extension 88 of said shroud 86 is secured to the bearing diaphragm 68 and engages the inner wall of the annular exhaust duct 54 rearwardly of the hollow struts 70. An annular diaphragm 90 engages the inner wall of the exhaust duct 54 forwardly of the hollow struts 70, the radially inner end of said diaphragm being secured to the bearing member 62. With this arrangement the shroud 86, its forward extension 88 and the diaphragm 90 form an annular chamber 92 about the rear end of the shaft 32 and within which the auxiliary units 56 are disposed and into which the hollow struts 70 extend.

The radially inner ends of the struts 70 are open to the chamber 92 and the radially outer ends of said struts are in communication with the interior of the hollow ring 72 through holes 94. The interior of the hollow ring 72 is in communication with the short hollow struts 80 and said struts are provided with holes 96. The struts 70, ring 72 and struts 80 thereby provide communication between the chamber 92 and the annular chamber 98 within the power plant housing 74 and disposed about the exhaust duct 54 and the turbine stator structure 78.

A sleeve 100 surrounds that portion of each strut 70 extending through the exhaust duct 54 to protect said strut from the hot exhaust gases of the turbine. The bearing diaphragm 68 has holes 102 providing for communication of the chamber 92 with the inner end of the annular space between each sleeve 100 and its associate strut 70. The outer end of each said annular space is in communication with the chamber 98.

During power plant operation, the shaft 32 is driven by the turbine 12 whereupon the centrifugal impeller 82 supplies relatively cool air from the surrounding atmosphere to the chamber 92. From the chamber 92 air flows through the hollow strut 70 and thence through the ring 72, the struts 80 and openings 96 in said struts into the chamber 98 whereupon said air flows over the stator structure 78 to cool said structure. From the chamber 98 this cooling air discharges into the surrounding atmosphere through holes (not shown) in the housing 74. This cooling of the turbine stator structure permits better control of the clearances between the turbine rotor blades and the cooperating stator structure.

Air also flows from the chamber 92 to the chamber 98 through the annular space between each sleeve 100 and its associated strut 70. This air flow keeps the struts 70 relatively cool and also helps to cool the stator structure 78. The struts 70 support the bearing structure 60 for the rear end of the turbine rotor. The maximum safe allowable load for each strut 70 obviously increases with decrease in temperature of said struts. Accordingly, it is important that the struts 70 be cooled well below the high temperature of the exhaust gases surrounding said struts in the exhaust duct 54.

A portion of the air supplied by the impeller 82 is used for cooling the periphery or rim of the turbine rotor. For this purpose, the shaft 32 is hollow and holes 104 through said shaft provide communication between the rear end of said shaft and the chamber 92. The forward end of the hollow shaft 32 is provided with holes 106 communicating with an annular chamber 108 formed between the shafts 32 and 44. An annular shroud 110 is secured to the turbine rotor disc 14 between the shaft flange 48 and the bosses 46. A second shroud member 112 is secured to the rotor disc 14 to form a streamlined annular air entrance opening between the shrouds 110 and 112 to the annular space between the shroud 110 and the rotor disc 14. A plurality of circumferentially spaced blades 114 are disposed across said annular space thereby forming a centrifugal impeller rotatable with and disposed on the combustion chamber or high temperature side of the rotor disc 14. The blades 114 are secured, as by welding, to the shroud 110, shroud 112 and/or to the adjacent side of the turbine rotor disc 14. The bosses 46 are preferably streamlined and are disposed between the blades 114 as best seen in Figure 3.

The centrifugal impeller formed by the blades 114 draws air from the annular chamber 108 and supplies said air to the periphery of the turbine rotor. At the turbine rotor periphery said air flows through passages 116 between the root ends of the turbine rotor blades, said air discharging from the passages 116 into the exhaust duct 54. The specific turbine rotor and blade structure forming the passages 116 constitutes no part of the present invention and a preferred construction is fully disclosed in copending application Serial No. 696,287 filed September 11, 1946 in the name of F. P. Sollinger, now Patent No. 2,603,453.

With the above described cooling system, the air supplied by the impeller 82 enters the chamber 92 and flows over the auxiliary units 56 to cool said units. A portion of the air supplied to the chamber 92 flows radially outwardly through the hollow struts 70 into the chamber 98 to cool the turbine stator structure 78. Another portion of the air supplied to the chamber 92 flows between the sleeves 100 and their associated struts 70 to cool said struts and to supply additional stator cooling air to the chamber 98. The remaining portion of the air supplied to the chamber 92 by the impeller 82 enters the hollow shaft 32 at the holes 104 and then flows from the other end of said shaft through holes 106 into the chamber 108 within the shaft 44. This latter portion of the air is drawn between the impeller blades 114 and is forced radially outwardly by said blades to the periphery of the turbine rotor. From the periphery of the turbine rotor this latter air flows through the passages 116 between the root ends of the impeller blades thereby cooling the periphery of the turbine rotor. The various flow paths of the cooling air for the turbine are indicated by arrows in Figure 1.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A gas turbine power plant comprising a rotor; a plurality of circumferentially spaced bosses on said rotor adjacent to its periphery; a shaft secured to said rotor at said bosses; an annular member secured to said rotor between said shaft and bosses, said member extending radially inwardly from said bosses in spaced relation to the adjacent end face of said rotor; and vanes extending between said member and the adjacent rotor end face to form a centrifugal impeller for supplying cooling air to the periphery of said rotor through the spaces between said bosses.

2. A gas turbine power plant comprising a rotor having a plurality of blades; a shaft drivably connected to said rotor; a stator structure surrounding said rotor blades and supporting a plurality of stator blades cooperable with said rotor blades; a combustion chamber for supplying combustion gases to said blades for driving said rotor; an annular duct for receiving the exhaust gases from said blades, said duct surrounding said shaft; a bearing for said shaft; a plurality of hollow struts for supporting said bearing and shaft, said struts extending through said annular duct; an air impeller drivably connected to said shaft; passage means providing communication between the discharge end of said impeller and the radially inner ends of said hollow struts for flow of cooling air from said impeller into said hollow struts; and passage means providing communication between the radially outer ends of said hollow struts and said stator blade supporting structure for flow of cooling air from said struts over said stator structure.

3. A gas turbine power plant comprising a rotor having a plurality of blades; a shaft drivably connected to said rotor; a stator structure surrounding said rotor blades and supporting a plurality of stator blades cooperable with said rotor blades; a combustion chamber for supplying combustion gases to said blades for driving said rotor; an annular duct for receiving the exhaust gases from said blades, said duct surrounding said shaft; a bearing for said shaft; a plurality of hollow struts for supporting said bearing and shaft, said struts extending through said annular duct; a jacket surrounding at least that portion of each of said struts within said duct; an air impeller drivably connected to said shaft; means providing communication between the discharge end of said impeller and the radially inner ends of said hollow struts and jackets for flow of cooling air from said impeller into said hollow struts and jackets; and passage means providing communication between the radially outer ends of said hollow struts and said stator blade supporting structure for flow of cooling air from said struts over said stator structure.

4. A gas turbine power plant comprising a rotor having a plurality of blades; a shaft drivably connected to said rotor; a stator structure surrounding said rotor blades and supporting a plurality of stator blades cooperable with said rotor blades; a combustion chamber for supplying combustion gases to said blades for driving said rotor; an annular duct for receiving the exhaust gases from said blades, said duct surrounding said shaft, a plurality of power plant auxiliary units drivably connected to said shaft and disposed about said shaft; a plurality of hollow struts extending through said annular duct for supporting said rotor and auxiliary units; an air impeller drivably connected to said shaft; passage means providing a flow path between the discharge end of said impeller and the radially inner ends of said hollow struts and within which said auxiliary units are disposed for flow of cooling air over said units and radially outwardly through said hollow struts; and passage means providing communication between the radially outer ends of said hollow struts and said stator blade supporting structure for flow of cooling air from said struts over said stator structure.

5. A gas turbine power plant comprising a rotor; a hollow shaft drivably connected to said rotor; a stator cooperable with said rotor; a combustion chamber for supplying combustion gases for driving said rotor; an annular duct for receiving the exhaust gases from said rotor; said duct surrounding said shaft; a plurality of hollow struts for supporting said bearing and shaft, said struts extending through said annular duct; an air impeller drivably connected to said shaft, said impeller supplying a portion of its air through said hollow struts for cooling said stator structure and supplying a portion of its air into said hollow shaft; a second air impeller drivably connected to said rotor, said second impeller being disposed on the side of said rotor opposite to said first-mentioned impeller and being arranged to receive air from said hollow shaft for supplying said air to the periphery of said rotor for cooling said rotor.

6. A gas turbine power plant comprising a rotor; a hollow shaft drivably connected to said rotor; a stator cooperable with said rotor; a combustion chamber for supplying combustion gases for driving said rotor; an annular duct for receiving the exhaust gases from said rotor, said duct surrounding said shaft; a plurality of hollow struts for supporting said bearing and shaft, said struts extending through said annular duct; said impeller supplying a portion of its air through said hollow struts for cooling said stator structure and supplying a portion of its air into said hollow shaft; a second hollow shaft drivably connected to said rotor adjacent to its periphery; a second air impeller drivably connected to said rotor, said second impeller being disposed within said second shaft on the side of said rotor opposite to said first-mentioned impeller and being arranged to receive air from said first-mentioned hollow shaft for supplying said air to the periphery of said rotor beyond the connection of said second shaft to said rotor for cooling said rotor periphery.

WILTON G. LUNDQUIST.

References Cited in the file of this patent

UNITED STATES PATENTS

| Number | Name | Date |
| --- | --- | --- |
| 1,640,784 | Lorenzen | Aug. 30, 1927 |
| 2,035,482 | Jodeiko | Mar. 31, 1936 |
| 2,117,131 | Auger | May 10, 1938 |
| 2,414,788 | Altorfer et al. | Jan. 28, 1947 |
| 2,465,846 | Clegern | Mar. 29, 1949 |
| 2,584,899 | McLeod | Feb. 5, 1952 |
| 2,591,399 | Buckland et al. | Apr. 1, 1952 |

FOREIGN PATENTS

| Number | Country | Date |
| --- | --- | --- |
| 504,781 | Great Britain | May 1, 1939 |
| 635,890 | Great Britain | Apr. 19, 1950 |